C. COMSTOCK.

CORNER IRON FOR WAGON BODIES.

No. 10,111. Reissued May 9, 1882.

Witnesses:

E. G. Asmus

Carl Pieschardt.

Inventor:

Charles Comstock by Street & Underwood

Attorneys.

N. PETERS, Photo-Lithographer, Washington, D. C.

UNITED STATES PATENT OFFICE.

CHARLES COMSTOCK, OF RACINE, WISCONSIN.

CORNER-IRON FOR WAGON-BODIES.

SPECIFICATION forming part of Reissued Letters Patent No. 10,111, dated May 9, 1882.

Original No. 234,853, dated November 30, 1880. Application for reissue filed February 18, 1882.

*To all whom it may concern:*

Be it known that I, CHARLES COMSTOCK, of Racine, in the county of Racine and State of Wisconsin, have invented certain new and useful Improvements in Corner-Irons for Wagon-Bodies; and I do hereby declare that the following is a full, clear, and exact description thereof.

My invention relates to corner-irons for wagon-bodies and will be fully described hereinafter.

Figure 2:
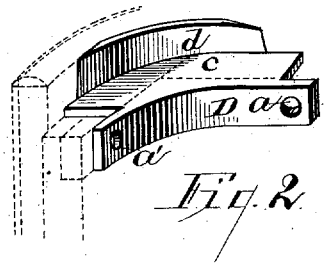
Figure 1:
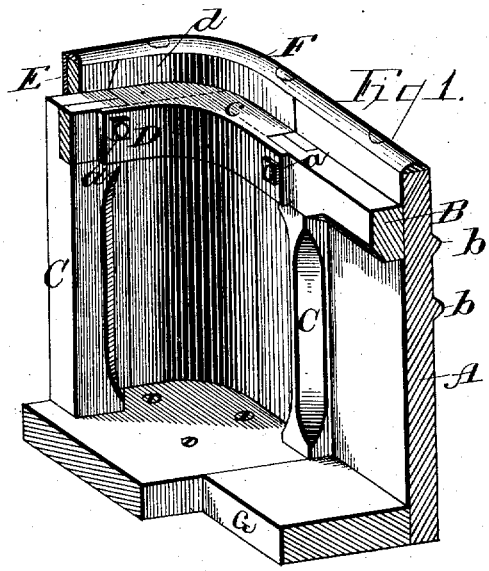
Figure 3:
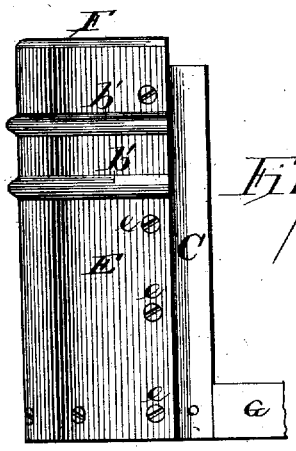

In the drawings, Figure 1 is a perspective view of the inside of a wagon-box corner embodying my invention. Fig. 2 is a detail and Fig. 3 is an outside view.

The body A is of ordinary construction, having inner side rails, B, and outer ribs, *b b*, posts C C supporting the ends of the side rails.

The outer portion of the corner-iron E may be of malleable cast-iron or any other suitable metal, and is provided with corrugations *b′ b′* to correspond with the ribs on the body.

D is a binding-piece, having flanges *c* and *d*. The flange *c* is shorter than the binding-piece proper and fits between the side rails, which are shouldered down for that purpose, while the flange *d* fits between the ends of the sides of the body. Bolts passed through holes in the binding-piece, through the side rails, posts C C, the sides of the wagon, and iron E bind the whole together so tightly as to prevent water from collecting in the joints. Screws *e e* will now serve to fasten the iron E to the sides and bottom rail, the ends of the ribs on the former joining with the corrugations on the iron to give a proper finish to the body, the corrugations abutting against and supporting the ribs. The ordinary facing-iron will cover the space between the top of flange *d* and the iron E, and the whole will form a complete and well-finished corner.

What I claim is—

1. A corner-iron, E, for wagon-bodies, having corrugations *b′ b′*, in combination with binding-piece D, having flanges *c d* and suitable bolts, whereby the end portions of the body are clamped between the corner-iron and the binding-piece, as set forth.

2. A corner-iron in combination with a clamping-piece, D, having flanges *c d* and suitable securing-bolts, as set forth.

In testimony that I claim the foregoing I have hereunto set my hand this 19th day of January, 1882.

CHAS. COMSTOCK.

Witnesses:

ISAAC A. WRIGHT,
L. H. BEYERLE.